No. 738,295. PATENTED SEPT. 8, 1903.
W. P. COLDREN.
APPARATUS FOR MAKING SEALING RINGS.
APPLICATION FILED APR. 30, 1903.
NO MODEL.
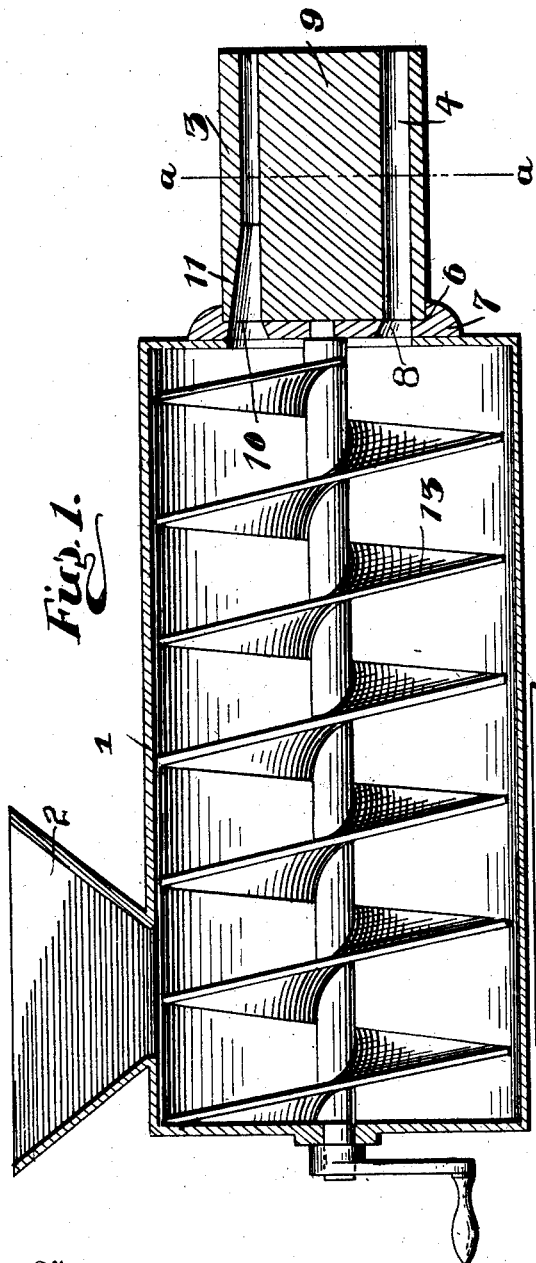
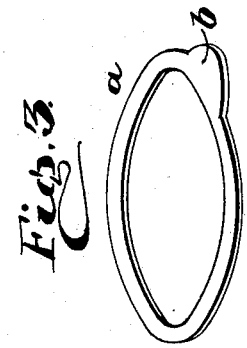
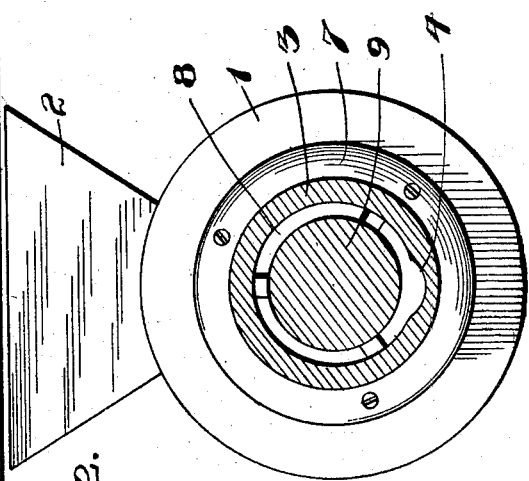
Inventor
William P. Coldren.
Witnesses
By
Attorney No. 738,295. Patented September 8, 1903.

UNITED STATES PATENT OFFICE.

WILLIAM P. COLDREN, OF LEBANON, PENNSYLVANIA.

APPARATUS FOR MAKING SEALING-RINGS.

SPECIFICATION forming part of Letters Patent No. 738,295, dated September 8, 1903.

Application filed April 30, 1903. Serial No. 155,014. (No model.)

*To all whom it may concern:*

Be it known that I, WILLIAM P. COLDREN, a citizen of the United States, residing at Lebanon, in the county of Lebanon and State of Pennsylvania, have invented certain new and useful Improvements in Apparatus for Making Sealing-Rings; and I do declare the following to be a full, clear, and exact description of the invention, such as will enable others skilled in the art to which it appertains to make and use the same.

My invention is an improved apparatus for making sealing-rings for fruit preserving and canning jars and for providing the sealing-rings, while the same are in process of manufacture, with laterally-projecting ears, by means of which they may be drawn outwardly at one point from between the neck of the jar and the cover thereof to break the vacuum in the jar and enable the cover to be readily unscrewed therefrom; and my invention consists in the peculiar construction and combination of devices hereinafter fully described and claimed.

In the accompanying drawings, Figure 1 is a longitudinal sectional view of an apparatus embodying my improvements. Fig. 2 is a transversely-sectional view of the same, taken on the plane indicated by the line $a\ a$ of Fig. 1; and Fig. 3 is a detail perspective view of one of the sealing-rings manufactured by my improved apparatus.

In the embodiment of my invention I provide a vessel 1 of suitable size and shape and constructed of suitable material, adapted to hold a quantity of rubber when the same is melted and in a fluid condition, and provided on its upper side, at one end, with a hopper 2, through which the melted rubber is applied thereto. At the opposite end of the vessel 1 is a former-spout 3, which is tubular, cylindrical in form, and provided in the lower side of its bore with a longitudinal former-groove 4, the same being of the size and shape of the lugs or ears which are to be formed on the sealing-rings. The bore of the former tube or spout corresponds in size with the exterior diameter of the sealing-rings.

The inner end of the former tube or spout 3 is secured in an annular groove 6 in the outer side of a collar 7, which collar is secured on the discharge end of the vessel 1 and is provided with an annular concentric opening 8. The inner end of the former-mandrel 9 is secured to the outer side of the central portion of the collar. The sides of the opening 8 are oppositely beveled and converge outwardly, and the inner end of the bore of the former tube or spout is also flared, as at 11, to correspond with the outer beveled side of the opening or channel 8. The beveled sides of the latter are indicated at 10.

It will be understood that as the molten rubber is forced from the vessel 1 through the former-spout, in which the mandrel is disposed and centered, the rubber as it hardens during its passage through the former-spout and around the mandrel will form a cylindrical tube having on its outer side a bead corresponding in size and shape with the groove 4 in one side of the former spout or tube and that by cutting the said rubber tube thus formed cross-sectionally to form the sealing-rings $a$ of suitable thickness each of the sealing-rings will be provided with a laterally-extending lip or lug $b$ on one side thereof, and which lip or lug may be readily grasped to enable the sealing-ring to be pulled outwardly at that point from between the neck of the can or jar and the cover thereof to admit air to the said can, and hence facilitate the removal of the cover.

A conveying-worm 13 is employed to force the molten rubber from the vessel 1 through the opening or channel 8 of the collar and through the bore of the former-tube 3 and around the mandrel. The shaft of the conveying-worm has one of its bearings in the outer end of the vessel 1 and its other bearing is in the center of the collar 7. It will be understood that when the conveying-worm is rotated in the proper direction the plastic rubber or composition will be forced outwardly through the bore of the former tube or spout, and owing to the flared inner end of the bore of the latter and the tapered inner end of the mandrel formed by the central portion of the collar 7 the material will be subjected to lateral pressure at the intake end of the former tube or spout, so that the sealing-rings will be of the required density.

From the foregoing description, taken in connection with the accompanying drawings, the construction, operation, and advantages of my invention will be readily apparent, it is thought, without requiring a more extended explanation.

Various changes in the form, proportion, and the minor details of construction may be resorted to without departing from the principle or sacrificing any of the advantages of this invention.

Having thus described my invention, what I claim, and desire to protect by Letters Patent, is—

1. In apparatus of the class described, the combination of a vessel having a former-tube provided with a longitudinal bead-forming groove in one side of its bore, a mandrel centered in and spaced from the former-tube, and means to force rubber in a fluid condition from the vessel through the former-tube and thereby produce a rubber tube having a longitudinal bead on one side, substantially as described.

2. In apparatus of the class described, the combination of a vessel having a former-tube provided with a longitudinal bead-forming groove in the lower side of its bore, a mandrel centered in and spaced from the former-tube, and means to force rubber in a fluid condition from the vessel through the former-tube and thereby produce a rubber tube having a longitudinal bead on one side, substantially as described.

In testimony whereof I have hereunto set my hand in presence of two subscribing witnesses.

WILLIAM P. COLDREN.

Witnesses:
 BENJ. G. COWL,
 WILBUR S. HAUER.